United States Patent [19]

Fridrich

[11] 4,248,584

[45] Feb. 3, 1981

[54] METHOD AND APPARATUS FOR DISPENSING SALT POWDER AS PELLETS IN LAMP MAKING

[75] Inventor: Elmer G. Fridrich, Chardon, Ohio

[73] Assignee: General Electric Company, Schenectady, N.Y.

[21] Appl. No.: 11,504

[22] Filed: Feb. 12, 1979

Related U.S. Application Data

[62] Division of Ser. No. 834,115, Sep. 19, 1977, Pat. No. 4,170,619.

[51] Int. Cl.[3] .......... B29C 1/00; B29C 11/00

[52] U.S. Cl. .......... 425/553; 425/579; 425/580; 425/585; 425/586; 425/256

[58] Field of Search .......... 425/256, 289, 542, 553, 425/579, 580, 586, 582, 585, 556

[56] References Cited

U.S. PATENT DOCUMENTS

| | | | |
|---|---|---|---|
| 829,014 | 8/1906 | Jaques | 42/289 |
| 965,298 | 7/1910 | Herbein | 425/579 |
| 1,890,802 | 12/1932 | Apple | 425/585 |
| 2,537,920 | 1/1951 | Smith | 425/579 |
| 2,810,181 | 10/1957 | Ruckstuhl | 425/579 |
| 3,905,735 | 9/1975 | Thomas et al. | 425/256 |

*Primary Examiner*—W. E. Hoag

*Attorney, Agent, or Firm*—Ernest W. Legree; Lawrence R. Kempton

[57] ABSTRACT

Highly purified metal halide salts are made into a frangible stick having uniformly spaced lines of weakness which permit the stick to be broken readily into cylindrical pellets of uniform size. The pellets are particularly useful to supply the vaporizable fill in high intensity metal halide discharge lamps. The stick is formed by intermittently loading salt powder into the sized entrance to a channel through which the salt is forced, and compressing the charge against the back end of previously formed salt stick by means of a polished plunger.

3 Claims, 6 Drawing Figures

METHOD AND APPARATUS FOR DISPENSING SALT POWDER AS PELLETS IN LAMP MAKING

This is a division of application Ser. No. 834,115, filed Sept. 19, 1977 and now U.S. Pat. No. 4,170,619.

The invention is particularly applicable to the manufacture of metal halide lamps which contain a filling of one or more metal halides which are hygroscopic.

BACKGROUND OF THE INVENTION

The metal halide lamp which began in the early sixties and contains mercury and metal halides for the fill has become one of the most useful and versatile light sources. It has good color rendition, high efficiency usually exceeding 100 lumens per watt in the larger sizes, and relatively long useful life in excess of 10,000 hours.

In the manufacture of these lamps, dispensing the required quantity of metal halide salt into the lamp envelope presents a problem because the inclusion of hydrogen or oxygen in any form is highly detrimental. Oxygen present within the envelope may oxidize metals such as tungsten which make up the lamp electrodes and the resulting metal oxide condenses on the envelope wall and reduces light transmission. When hydrogen is also present, a cyclic action may take place wherein the hydrogen reduces metal oxide on the walls back to metal, freeing the oxygen to attack other electrode metal. The cyclic action continues resulting in rapid erosion of the electrodes and darkening of the walls to the point where useful life is terminated. In order to prevent or alleviate the foregoing possibilities, it is necessary to use for the fill highly purified materials, for instance metal halide salts wherein impurities such as hydrogen or oxygen are held down to a few parts per million, for instance less than 20 ppm. In addition, since many of the metal halides are highly hygroscopic, it is necessary to handle them in such fashion as to minimize the absorption of moisture or impurities from the atmosphere.

U.S. Pat. No. 3,676,534—Anderson, Process Relating to Ultrapure Metal Halide Particles, 1972, describes a vacuum shot tower technique for preparing purified metal halides as spheroidal particles of controlled size. While such particles have been successfully used in lamp making, the cost of preparing them is relatively high. Also the process for preparing them suffers from lack of flexibility in the size of particle produced.

SUMMARY OF THE INVENTION

The object of the invention is to provide a method and apparatus for preparing pellets containing a closely controlled quantity of highly purified metal halide salts suitable for lamp making. The method should be economical and convenient to use in connection with lamp making. It must avoid contamination of the salts and desirably should provide flexibility in the size of pellet produced.

In accordance with my invention, highly purified metal halide salt powders are made into a continuous slender rod or stick having uniformly spaced transverse lines or planes of weakness which permit the stick to be broken readily into pellets of uniform size. In a preferred embodiment, the stick is formed by intermittently loading salt powder into the entrance to a restricted channel in a die and compressing the charge, by means of a smooth-faced plunger, against salt previously forced through the channel and which now forms a stick. As each charge of salt is added and compressed against the back end of the stick, it bonds itself to the stick as a new segment. However the smooth end surface that was left by the polished face of the plunger at the prior compression stroke makes a weak joint. Thus the stick is quite frangible, consisting of bonded segments of compressed salt which are readily broken off as pellets.

DESCRIPTION OF PREFERRED EMBODIMENT

Figure 1:
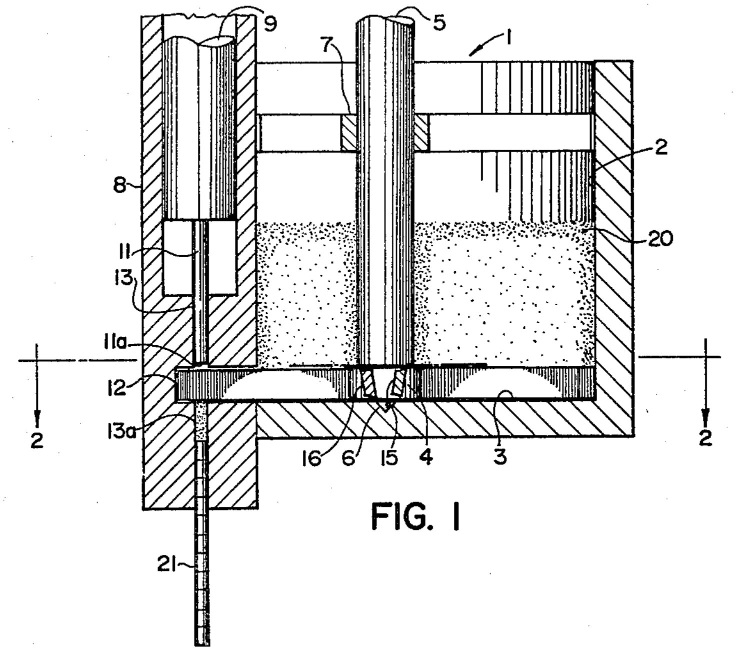
FIG. 1 is a side sectional elevation of pelletizing apparatus embodying the invention, taken on line 1—1 of FIG. 2.
Figure 2:
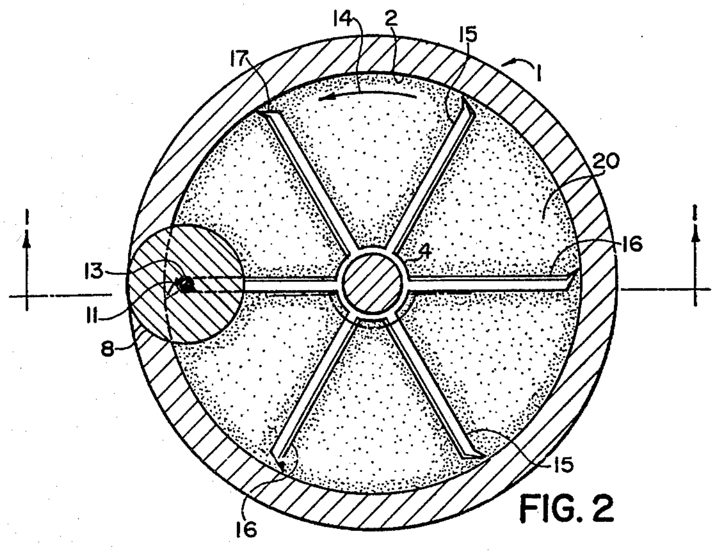
FIG. 2 is a plan sectional view of the pelletizing apparatus taken on line 2—2 of FIG. 1.
Figure 3:
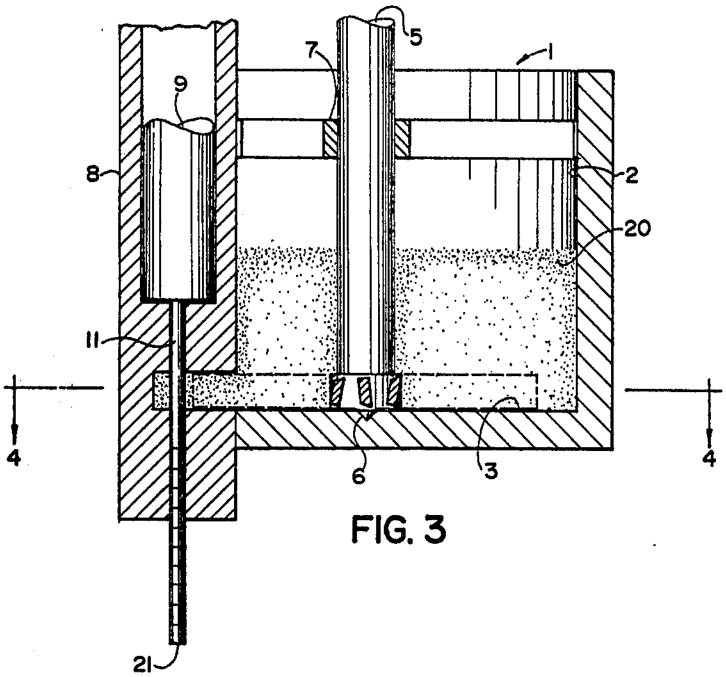
FIG. 3 is a view similar to that of FIG. 1 but with the plunger at the limit of its downstroke and taken on line 3—3 of FIG. 4.

Referring to FIGS. 1 and 2, the apparatus comprises a generally cylindrical receptacle 1 having a circular side wall 2 and a flat bottom wall 3. A stirrer 4 comprising six blades or vanes affixed to a shaft 5 is arranged to revolve in the bottom of the receptacle and is supported by means of a bearing cone 6 and an upper bearing 7. The receptacle walls are shaped on one side to accommodate a vertical cylindrical member 8 which projects partly into the inner volume of the receptacle. The upper part of member 8 is formed as a sleeve through which can move a piston 9 having a plunger pin 11 projecting down from its lower face. Member 8 has a cut-out conduit portion 12 coinciding with the portion of the receptacle through which the stirrer blades sweep. The plunger pin moves through a channel 13 which extends above and below the cut-out portion 12, and the portion of member 8 below the cut-out is in effect a die.

Figure 5:
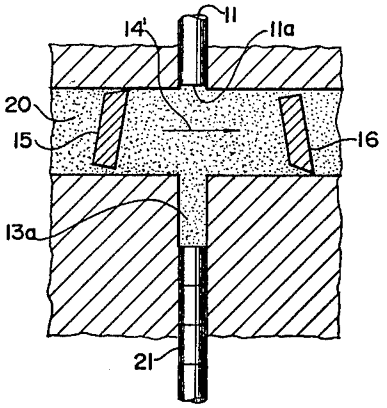
FIG. 5 is a cross-sectional detail to a larger scale through the die with the stirrer blades diagrammatically represented.

The rotation of stirrer 4 and the reciprocation of piston 9 may be done either manually or automatically by means of machinery. The stirrer as illustrated is intended to revolve in a counterclockwise direction as indicated by curved arrow 14 in FIG. 2. As best seen in FIG. 5, alternate blades of the stirrer serve as wipers and ceiling scrapers 15, while the intervening blades serve as floor scrapers or plows 16. The wipers 15 lean forward relative to the direction of motion indicated by arrow 14 in FIG. 5 in order to promote sweeping salt into the powder zone 13*a* of channel 13. The plows on the other hand are tipped back and are arranged to bear against the bottom wall 3 to prevent the packing of salt thereagainst. The upper edges of the wipers bear against the ceiling of the cut-out or conduit portion 12. Also the outer or peripheral edges 17 of the blades are beveled and bear against the circular side wall 2. These measures are not essential but are desirable to prevent packing of salt against the adjacent surfaces. The plunger 11 which compresses the salt down into channel 13 is desirably made of a hard, dense non-reactive material, preferably tungsten, and the driving face 11*a* is polished smooth. Other parts of the apparatus which come into contact with the salt powder may be made of molybdenum, and preferably those surfaces where abrasion can take place are silicided in order to provide a smooth, hard, mirror-like finish. Such surfaces include the lower die portion containing channel 13, the stirrer including wipers 15 and plows 16, and the interior surfaces of receptacle 1.

Figure 4:
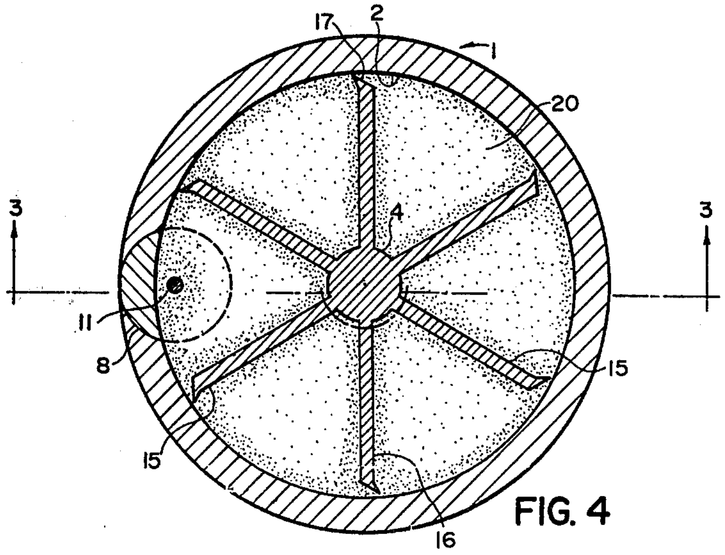
FIG. 4 is a plan sectional view similar to that of FIG. 2 but taken on line 4—4 of FIG. 3.

The apparatus is utilized as follows in carrying out the method of the invention. The dosing material 20 consisting of a mixture of highly purified metal halide salts in powder form is put into the receptacle 1. At this moment piston 9 is at its upper limit of movement so that plunger pin 11 is drawn up out of the path of movement of the blades of stirrer 4 as indicated in FIG. 1. The stirrer is revolved and sweeps salt down into the opening of channel 13. The loose salt fills the entrance portion or powder zone 13*a* of the channel which comprises the space between the floor of the die and the back end of a salt rod or stick 21 that was previously formed and which is still retained in the channel. In the absence of such a salt stick, a metal rod of appropriate size may be inserted into the die channel from the bottom and held in place temporarily to start the process. The loose salt is thus retained in place in the channel until the initial compression of the first salt segment has occurred. Thereafter compression of subsequent salt charges takes place against salt previously forced through the channel, resulting in the formation of a frangible salt stick. The stirrer is stopped in a position as indicated in FIG. 4 where none of the blades interfere with the path of movement of plunger 11. When piston 9 is moved down, plunger pin 11 passes through the loose salt in cut-out portion 12 and enters the powder zone 13*a* of the channel. In the cut-out portion, the loose salt is mostly shoved aside but in channel 13 it is compressed against the back end of the salt stick (or the substitute therefore). This adds one segment to the salt stick which as a result is shoved bodily through the channel the distance corresponding to the added segment. The polished face 11*a* of the plunger assures a line or plane of weakness where the added segment is bonded to the salt stick. The described sequence of operations is repeated as many times as needed, each time adding one frangible segment to the salt stick.

The length of the channel 13 through the die should be several times its diameter in order to develop adequate frictional resistance at the walls to achieve the necessary pressure for compressing the salt. By way of example, with some salts a push-through having a length of 6 diameters was sufficient to develop a resistance requiring 30,000 lbs./in$^2$ to overcome. This figure will change, of course, depending upon the nature of the salt and the coefficient of friction at the surface of channel 13 but it is a matter which is easily determined experimentally.

Figure 6:
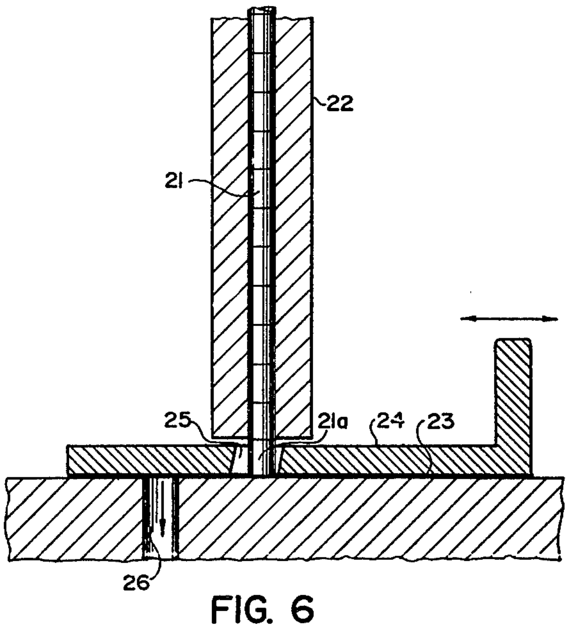
FIG. 6 is a diagrammatic side sectional elevation of a pellet dispensing device using the frangible salt sticks of the invention.

What comes out of channel 13 in the die is a frangible stick 21 of bonded segments of compressed salt which are readily broken off as pellets. The frangible sticks may conveniently be handled as such and pellets broken off therefrom by an operator as needed at a lamp filling station. A feeder device for doing so conveniently is illustrated in FIG. 6. The frangible salt stick 21 is put in a magazine comprising a feed tube 22 through which the stick drops freely to a table surface 23. A slide member 24 is interposed between the lower end of the tube and the table surface, and includes a cavity 25 which will accommodate the lowermost segment of the stick. The cavity is a hole with inclined walls such that the right hand wall exerts a bending moment on stick segment 21*a* when the slide is urged to the left. Further movement of the slide carries the broken off segment as a separate pellet to delivery chute 26 from whence it is released into a lamp envelope. When the slide is retracted to the right, the salt stick drops into the cavity to the extent of another segment, and the device is then ready for a repeat operation. As an alternative to such a feeder device, a mechanical device may be provided to snap or break off segments from the salt stick as it emerges from channel 13 at the bottom face of the die. The invention thus makes available measured or predetermined quantities of salt charge while sparing the operator from having to pick up tiny particles from a mass one at a time.

The apparatus may be made extremely compact such that it may readily be operated within a dry box of convenient size by an operator reaching in and manipulating the parts through flexible glove shields. Alternatively, the apparatus may be completely enclosed and mechanized so as to eliminate entirely the hazard of atmospheric contamination. In such case the apparatus is small enough that it may be mounted immediately upon the lamp making machine and the pellet output transported directly into the lamp envelopes where they are required. By way of example of dimensions, FIGS. 1 to 4 on the original drawings for this application are four times full size. Channel 13 in the die has a diameter of 0.76 millimeters (30 mil), and a force of 20 lbs. on the piston develops about 30,000 lbs./in$^2$ pressure on the salt in the channel (neglecting frictional losses). Pellets were produced 0.76 mm in diameter by 1.3 mm long. The pellet volume was 0.59 mm$^3$ with a weight between 2 and 2.6 mm depending upon salt composition. The salts used were NaI having a density of 3.66, $ScI_3$ having a density of 2.46, and $ThI_4$ having a density of 6.0.

An advantage of my pelletizing method is its inherent flexibility in allowing adjustment of pellet size. Within a restricted range, pellet size is adjusted by varying the stroke, that is the vertical displacement of piston 9 and plunger pin 11 attached to it. When the piston stroke is increased, the powder zone 13*a* is lengthened and this increases the quantity of salt supplied per segment, and also the length of the salt segment and of the pellet resulting from it. For greater variations in size, a different plunger pin, either larger or smaller in diameter as needed, and die channel 13 corresponding to it are utilized.

What I claim as new and desire to secure by Letters Patent of the United States is:

1. Apparatus for producing frangible salt sticks made up of bonded segments, each segment comprising a predetermined quantitiy of metal salt, comprising:

a die having a restricted channel therethrough including an entrance portion defining a powder zone, said channel having a length several times its maximum transverse dimension in order to develop frictional resistance at the walls adequate to compress a charge of moldable material as it is forced through, means for filling said powder zone with a charge of metal salt powder including a receptable for salt powder having a smooth-walled conduit portion communicating with said powder zone, and stirrer means mounted for rotation about a vertical axis within said receptacle for sweeping salt into said powder zone, said stirrer means including sharpedged blades sweeping through said conduit portion and engaging the walls thereof, and a smooth-faced plunger movable through said powder zone for compressing said charge of salt powder and bonding it as a frangible segment to a salt stick formed by prior charges of salt forced through said channel.

2. Apparatus as in claim 1 plus means for snapping off frangible segments from said salt stick as individual pellets.

3. Apparatus as in claim 1 wherein said plunger is a tungsten pin having its driving face polished smooth to obtain a plane of weakness where each segment is bonded to the salt stick.

* * * * *